United States Patent Office 3,772,308
Patented Nov. 13, 1973

3,772,308
CYCLOPENTANEACETAMIDES AND CYCLO-PENTANEACETONITRILES
Richard P. Pioch, Indianapolis, Ind., assignor to Eli Lilly and Company, Indianapolis, Ind.
No Drawing. Filed June 2, 1972, Ser. No. 259,185
Int. Cl. C07d 29/30, 29/32
U.S. Cl. 260—293.76                                5 Claims

ABSTRACT OF THE DISCLOSURE

Cyclopentaneacetamide and cyclopentaneacetonitrile derivatives which have anti-inflammatory activity, and intermediates useful in the preparation thereof.

SUMMARY OF THE INVENTION

The present invention relates to compounds of the following formula:

(I)
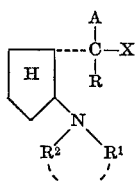

wherein

R represents hydrogen, a straight- or branched-chain alkyl of 1 to 4 carbon atoms, cycloalkyl of 3 to 7 carbon atoms, phenyl, or phenyl bearing one or two substituents, each of which individually is halogen of atomic weight less than 85 or a straight- or branched-chain alkyl of 1 to 3 carbon atoms;

A represents phenyl; or phenyl bearing one or two substituents, each of which individually is halogen of atomic weight less than 85 or a straight- or branched-chain alkyl of 1 to 3 carbon atoms; or, when R is hydrogen or alkyl as defined, A additionally can represent naphthyl;

X represents carbamoyl or cyano; and each or $R^1$ and $R^2$, when taken separately, independently represents hydrogen, a straight- or branched-chain alkyl of 1 to 3 carbon atoms, or benzyl; or $R^1$ and $R^2$, when taken together, jointly constitute with the nitrogen atom to which they are attached pyrrolidino, piperidino, 4-(straight- or branched-chain alkyl of 1 to 4 carbon atoms)piperazino, hexamethyleneimino, or morpholino;

and the pharmaceutically-acceptable acid-addition salts thereof.

The present invention is also directed to novel intermediates of the formula:

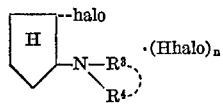

wherein each of $R^3$ and $R^4$, when taken separately, independently represents a straight- or branched-chain alkyl of 1 to 3 carbon atoms or benzyl; or $R^3$ and $R^4$, when taken together, jointly constitute with the nitrogen atom to which they are attached piperidino, pyrrolidino, 4- (straight- or branched-chain alkyl of 1 to 4 carbon atoms) piperazino, hexamethyleneimino, or morpholino; halo, in each occurrence, represents the same moiety selected from bromo and chloro; and $n$ is 0 or 1, or when $R^3$ and $R^4$ taken together represent piperazino as defined, $n$ additionally can represent 2. These compounds are useful in the preparation of the foregoing products of the present invention. As indicated by the structural formulae above, the compounds of the present invention are in the trans configuration.

DETAILED DESCRIPTION OF THE INVENTION

The scope of compounds in accordance with the present invention is as defined hereinabove.

The pharmaceutically-acceptable acid-addition salts of compounds of Formula I are included within the scope of this invention. "Pharmaceutically-acceptable" salts are those salts formed from acids which do not increase the toxicity of the compound as a whole toward warm-blooded animals. Otherwise the identity of the salt-forming moiety is not critical, although in some instances a given anion may exhibit special advantages, such as ready solubility, ease of crystallization, and the like. Representative and suitable acids include the following: hydrochloric, hydrobromic, hydroiodic, sulfuric, tartaric, phosphoric, maleic, nitric, and the like.

Generally, the compounds of Formula I wherein $R^1$ and $R^2$ are other than hydrogen are prepared using corresponding 2-(substituted-amino) cyclopentanol derivatives as starting materials. The reaction sequence is illustrated as follows:

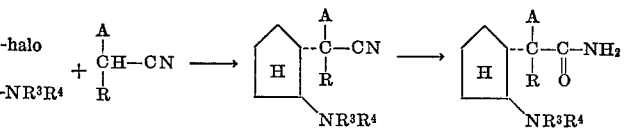

Some of the starting cyclopentanol derivatives are known in the art. The cyclopentanol derivatives which are novel are prepared by reacting cyclopentene oxide with an appropriate amine. The reaction is readily accomplished by heating the reactants under reflux for a period of time and separating the product alcohol, typically by distillation.

The 2 - (substituted-amino)cyclopentanol thus formed is converted to a 2-halocyclopentylamine by treatment with a halogenating agent (reference: Donald J. Cram and George S. Hammond, "Organic Chemistry," 2nd ed., McGraw-Hill, New York, N.Y., 1964, pp. 258–9). This reaction is conveniently accomplished by reacting a 2-(substituted-amino)cyclopentanol with a reagent such as, for example, thionyl chloride, thionyl bromide, phosphorus pentachloride, phosphorus oxychloride or phosgene in an inert solvent under reflux to give the corresponding, novel 2-halocyclopentylamine derivative, typically as the hydrohalide salt. This salt is readily converted to the free base for use in the subsequent reaction in accordance with the present invention.

The compound of Formula I wherein X is cyano is prepared by alkylation of an appropriately substituted acetonitrile with a 2-halocyclopentylamine derivative, as prepared above (reference: R. B. Wagner and H. D. Zook, "Synthetic Organic Chemistry," John Wiley, New York, N.Y., 1965, p. 599). The substituted acetonitriles used as starting materials are known in the art. Those starting nitriles which are not readily available are prepared by established procedures, for example by reacting an appropriate alkyl halide or cycloalkyl halide with a specified phenylacetonitrile, substituted-phenylacetonitrile, or naphthylacetonitrile in the presence of base (references: A. W. Ruddy and T. J. Becker, U.S. Pat. 2,662,886; S. Casadio and G. Pala, British Pat. 969,068 (Chem. Abstr., 61:16026h)); by condensing a substituted benzaldehyde cyanohydrin with benzene or a substituted-benzene using boron trifluoride (reference: J. Mills, U.S. Pat. 2,447,419); or by benzene reaction of a substituted halobenzene with phenylacetonitrile (reference: T. Kametani et al., J. Org. Chem., 36, 327 (1971)). The alkylation reaction consists of treating the starting nitrile with a reagent such as sodium amide or lithium amide in an aprotic solvent such as benzene or toluene and heating under reflux to form a carbanion. This carbanion reacted directly with the 2-halocyclopentylamine derivative. The reactants are heated under reflux, separated and purified by standard methods to obtain the desired compound of Formula I wherein X is cyano.

In the final step of the reaction sequence outlined above, the Formula I nitrile derivative is hydrated to the Formula I amide (X is carbamoyl). This reaction is conveniently effected by heating the Formula I nitrile with about 80–90 percent sulfuric acid for a period of time and pouring the resulting solution onto an ice-ammonia mixture (reference: R. B. Wagner and H. D. Zook, "Synthetic Organic Chemistry," John Wiley, New York, N.Y., 1965, p. 570). Separation and purification by well-known methods give the desired compound of Formula I wherein X is carbamoyl.

The compounds of Formula I wherein either one or both of $R^1$ and $R^2$ represent hydrogen are conveniently prepared by reductive debenzylation of the alkylbenzylamine or dibenzylamine analogs (R. B. Wagner and H. D. Zook, "Synthetic Organic Synthesis," John Wiley, New York, N.Y., 1965, p. 665). An N-alkyl-N-benzyl-2-chlorocyclopentylamine or N,N-dibenzyl-2-chlorocyclopentylamine is prepared by the method described hereinabove and is reacted with a starting nitrile to form 2-(N-alkyl-N-benzylamino)-α-A-α-R-cyclopentaneacetonitrile or 2 - (N,N-dibenzylamino)-α-A-α-R-cyclopentaneacetonitrile. The corresponding Formula I amides are prepared from these nitriles, as described. The reductive debenzylation of either the Formula I nitrile or the Formula I amide is conveniently carried out in an amphiprotic solvent such as, for example, 95 percent ethanol under hydrogen pressures of from 15 to 60 pounds per square inch, using a catalyst such as palladium-on-carbon or platinum to obtain the compounds of Formula I wherein either one or both of $R^1$ and $R^2$ represent hydrogen. To prepare the 2-(benzylamino)cyclopentaneacetonitrile or 2-(benzylamino)cyclopentaneacetamide compounds of Formula I, hydrogenation conditions must be controlled to achieve monodebenzylation (reference: Walter H. Hartung and Robert Simonoff in "Organic Reactions," Roger Adams, ed., John Wiley & Sons, New York, N.Y., 1953, pp. 263–326). In an alternate pathway to Formula I debenzylated amides, the debenzylated Formula I nitrile (either one or both of $R^1$ and $R^2$ is hydrogen) is hydrated to the desired amide by the procedure described hereinabove.

The compounds of Formula I form acid-addition salts. These salts are prepared using conventional methods by reacting a free base of Formula I with a stoichiometric amount of appropriate acid. Separation and, if desired, purification are accomplished by established procedures.

The following examples illustrate the synthesis of representative compounds of the present invention.

EXAMPLE 1

Trans-2-chloro-N,N-dimethylcyclopentylamine hydrochloride

Thionyl chloride (24 g., 0.2 mole) was added to a stirred solution of trans-2-(dimethylamino)cyclopentanol (12.9 g., 0.1 mole) in chloroform (100 ml.). The resulting solution was heated under reflux for 7.5 hours. After cooling, the solvent and excess thionyl chloride were evaporated under vacuum. The residue thus obtained was dissolved in a few milliliters of absolute methanol; ethyl acetate was carefully added, thereby obtaining 3.3 g. of hygroscopic trans - 2 - chloro-N,N-dimethylcyclopentylamine hydrochloride, melting point 157–162° C. (d.).

*Analysis.*—Calculated for $C_7H_{15}Cl_2N$ (percent): C, 45.66; H, 8.21; N, 7.61. Found (percent): C, 45.38; H, 8.49; N, 7.46.

EXAMPLE 2

Trans-2-(dimethylamino)-α,α-diphenylcyclopentaneacetonitrile

A solution of diphenylacetonitrile (6.1 g., 0.0315 mole) in dry benzene (25 ml.) was added to a stirred suspension of sodium amide (1.56 g., 0.0315 mole) in dry benzene (75 ml.). The resulting mixture was heated under reflux until evolution of ammonia ceased. The purple solution thus formed was chilled and stirred during the dropwise addition of a solution of trans-2-chloro-N,N-dimethylcyclopentylamine (prepared from 5.52 g., 0.03 mole of 2-chloro-N,N-dimethylcyclopentylamine hydrochloride) in dry benzene. The resulting solution was stirred and heated under reflux for about 16 hours. The reaction mixture was cooled, washed with water and extracted with 15 ml. of cold 3 N hydrochloric acid. The acidic extract was washed with diethyl ether and then was made basic by addition of dilute sodium hydroxide solution. An oil separated and was extracted with diethyl ether. The ether solution was washed with water, dried ($MgSO_4$) and evaporated under vacuum to give 4.7 g. of crystalline base. This product was recrystallized from absolute ethanol to give 3.25 g. of trans-2-(dimethylamino) - α,α - diphenylcyclopentaneacetonitrile, melting point 132.5–137° C.

*Analysis.*—Calculated for $C_{21}H_{24}N_2$ (percent): C, 82.85; H, 7.95; N, 9.20. Found (percent): C, 82.98; H, 8.15; N, 9.14.

EXAMPLE 3

Trans-2-(dimethylamino)-α,α-diphenylcyclopentaneacetamide

A solution of trans-2-(dimethylamino)-α,α-diphenylcyclopentaneacetonitrile (2 g.) in 90 percent sulfuric acid (4 ml.) was heated on a steam bath for about 28 hours. The resulting solution was poured onto a mixture of ice and ammonium hydroxide. A solid separated and was extracted into chloroform. The chloroform extract was washed with water, dried ($MgSO_4$) and evaporated under vacuum to give a crystalline residue. The infrared spectrum of this residue had a strong band at 6.03μ, indicating the presence of the amide carbonyl. Recrystallization from a benzene-cyclohexane mixture gave 1.6 g. of trans-2 - (dimethylamino)-α,α-diphenylcyclopentaneacetamide, melting point 175–180° C.

*Analysis.*—Calculated for $C_{21}H_{26}N_2O$ (percent): C, 79.00; H, 7.84; N, 8.38. Found (percent): C, 78.88; H, 8.22; N, 8.52.

EXAMPLE 4

Trans-1-(2-chlorocyclopentyl)piperidine hydrochloride

Thionyl chloride (21 g., 0.175 mole) was added dropwise with stirring to a solution of trans-2-piperidinocyclopentanol (20.0 g., 0.118 mole) in dry benzene (500 ml.). The resulting mixture was stirred and heated under reflux for 10 hours. Upon cooling a crystalline solid formed and was separated by filtration, washing well with benzene. The crude product was recrystallized by dissolving in hot methanol and carefully adding ethyl acetate to give 20.0 g. of trans-1-(2-chlorocyclopentyl)piperidine hydrochloride, melting point 178–181° C.(d.).

*Analysis.*—Calculated for $C_{10}H_{19}Cl_2N$ (percent): Cl, 31.63; N, 6.25. Found (percent): Cl, 31.66; N, 5.99.

EXAMPLE 5

Trans-α,α-diphenyl-2-piperidinocyclopentaneacetonitrile

A solution of diphenylacetonitrile (10.3 g., 0.053 mole) in toluene was added with stirring to a suspension of sodium amide (2.26 g., 0.058 mole) in dry toluene (150 ml.). The resulting mixture was stirred and heated under reflux until evolution of ammonia ceased. The mixture was cooled before the dropwise addition of a solution of trans-1-(2-chlorocyclopentyl)piperidine (prepared from 11.2 g., 0.05 mole of the hydrochloride) in toluene. The mixture was stirred and heated under gentle reflux for 16 hours. The resulting solution was cooled, washed with water, and extracted with an excess of cold, dilute hydrochloric acid. The acidic extract was washed with diethyl ether and made basic with ammonium hydroxide; the resulting oil was extracted into chloroform. The chloroform extract was washed with water, dried ($Na_2SO_4$), and evaporated under vacuum to give 9.5 g. of trans-α,α-diphenyl - 2 - piperidinocyclopentaneacetonitrile, melting point 105–107° C.

*Analysis.*—Calculated for $C_{24}H_{28}N_2$ (percent): C, 83.67; H, 8.19; N, 8.13. Found (percent): C, 83.53; H, 8.54; N, 8.03.

EXAMPLE 6

Trans-α,α-diphenyl-2-piperidinocyclopentaneacetamide

Trans - α,α - diphenyl - 2 - piperidinocyclopentaneacetonitrile was hydrated according to the method of Example 3 to give α,α-diphenyl-2-piperidinocyclopentaneacetamide, crystallized from cyclohexane, melting point 172–175° C.

*Analysis.*—Calculated for $C_{24}H_{30}N_2O$ (percent): C, 79.51; H, 8.34; N, 7.73. Found (percent): C, 79.40; H, 8.45; N, 7.58.

EXAMPLE 7

Trans-2-chloro-N-benzyl-N-methylcyclopentylamine hydrochloride

Trans - 2 - (N - benzyl - N - methylamino)cyclopentanol was treated with thionyl chloride according to the method of Example 1 to give trans - 2 - chloro - N - methylcyclopentylamine hydrochloride.

*Analysis.*—Calculated for $C_{13}H_{19}Cl_2N$ (percent): Cl, 27.25; N, 5.38. Found (percent): Cl, 26.91; N, 5.27.

EXAMPLE 8

Trans-2-(N-benzyl-N-methylamino)-α,α-diphenylcyclopentaneacetonitrile

Diphenylacetonitrile was alkylated with trans-2-chloro-N - benzyl - N - methylcyclopentylamine according to the method of Example 2 to give trans-2-(N-benzyl-N-methylamino) - α,α - diphenylcyclopentaneacetonitrile, melting point 93–95° C.

EXAMPLE 9

Trans-2-(methylamino)-α,α-diphenylcyclopentaneacetonitrile hydrochloride

A solution of trans-2-(N-benzyl-N-methylamino)-α,α-diphenylcyclopentaneacetonitrile hydrochloride (3.35 g.) in 95 percent ethanol (200 ml.) containing 12 N hydrochloric acid (1 ml.) and 5 percent palladium-on-carbon (100 mg.) was shaken in a Parr apparatus under an initial pressure of 35 pounds per square inch of hydrogen. Hydrogen uptake ceased after four hours. The catalyst was removed by filtration, and the filtrate was evaporated under vacuum to give a residue which crystallized from ethyl acetate (2.7 g.). This product was recrystallized from a methanol-ethyl acetate mixture to give 1.95 g. of trans-2-(methylamino) - α,α - diphenylcyclopentaneacetonitrile hydrochloride, melting point 191–194° C.

*Analysis.*—Calculated for $C_{20}H_{23}ClN_2$ (percent): C, 73.48; H, 7.09; N, 8.57. Found (percent): C, 73.27; H, 7.10; N, 8.29.

EXAMPLE 10

Trans-2-(methylamino)-α,α-diphenylcyclopentaneacetamide

Trans - 2 - (methylamino)-α,α-diphenylcyclopentaneacetamide was hydrated according to the method of Example 3, heating the solution for about 40 hours and crystallizing the product from benzene-cyclohexane to give trans-2-(methylamino) - α,α - diphenylcyclopentaneacetamide, melting point 111–113° C.

*Analysis.*—Calculated for $C_{20}H_{24}N_2O$ (percent): C, 77.88; H, 7.84; N, 9.08. Found (percent): C, 78.11; H, 8.07; N, 8.78.

EXAMPLE 11

Trans-α-(p-chlorophenyl)-2-(dimethylamino)-α-phenylcyclopentaneacetonitrile hydrochloride Trans - 2 - chloro - N,N - dimethylcyclopentylamine and α-(p-chlorophenyl)-α-phenylacetonitrile were reacted according to the method of Example 2 to give trans-α-(p-chlorophenyl) - 2 - (dimethylamino) - α - phenylcyclopentaneacetonitrile, crystallized as the hydrochloride salt from methanolethyl acetate, melting point 200° C. (d.).

*Analysis.*—Calculated for $C_{21}H_{24}Cl_2N_2$ (percent): C, 67.20; H, 6.44; N, 7.45. Found (percent): C, 67.09; H, 6.75; N, 7.30.

EXAMPLE 12

Trans-α-(p-chlorophenyl)-2-(dimethylamino)-α-phenylcyclopentaneacetamide

Trans - α - (p-chlorophenyl) - 2 - (dimethylamino)-α-phenylcyclopentaneacetonitrile was hydrated in 90 percent sulfuric acid, according to the method of Example 3, heating the solution for about 37 hours and crystallizing the product from benzene-cyclohexane to give trans-α-(p-chlorophenyl)-2-(dimethylamino) - α - phenylcyclopentaneacetamide, melting point 177.5–180° C.

*Analysis.*—Calculated for $C_{21}H_{25}ClN_2O$ (percent): C, 70.66; H, 7.06; N, 7.85. Found (percent): C, 70.69; H, 7.33; N, 7.64.

EXAMPLE 13

Trans-2-(dimethylamino)-α-methyl-α-phenylcyclopentaneacetonitrile

α-Phenylpropionitrile and trans-2-chloro-N,N-dimethylcyclopentylamine were reacted according to the method described in Example 2. The oily free base was converted to the hydrochloride which crystallized from ethyl acetate, melting point 160–164° C. (d.). Reconversion to the free base and distillation gave trans - 2 - (dimethylamino)-α-methyl - α - phenylcyclopentaneacetonitrile, boiling point 120° C./0.5 mm.

*Analysis.*—Calculated for $C_{16}H_{22}N_2$ (percent): C, 79.29; H, 9.15; N, 11.56. Found (percent): C, 78.73; H, 9.15; N, 11.56. Found (percent): C, 78.73; H, 9.29; N, 11.85.

EXAMPLE 14

Trans-2-(dimethylamino)-α-methyl-α-phenylcyclopentaneacetamide

Trans-2-(dimethylamino)-α - methyl - α - phenylcyclopentaneacetonitrile was hydrated with 90 percent sulfuric acid by the method of Example 3, heating for 16 hours and crystallizing the crude product from ethyl acetate to give trans-2-(dimethylamino)-α-methyl - α - phenylcyclopentaneacetamide, melting point 160–166° C.

*Analysis.*—Calculated for $C_{16}H_{24}N_2O$ (percent): C, 73.80; H, 9.29; N, 10.76. Found (percent): C, 73.78; H, 9.27; N, 10.68.

EXAMPLE 15

Trans-α-cyclopentyl-2-(dimethylamino)-α-phenylcyclopentaneacetonitrile hydrochloride A suspension of sodium amide was prepared by the standard method from sodium (3 g., 0.13 g. atoms) in anhydrous ammonia (400 ml.). A solution of α-phenylcyclopentaneacetonitrile (16.4 g., 0.12 mole) in dry toluene (75 ml.) was added to the stirring sodamide suspension. When this addition was completed, the ammonia was allowed to evaporate and was replaced with an equal volume of toluene. To the resulting suspension was added with stirring a dry solution of trans - 2 - chloro - N,N-dimethylcyclopentylamine (prepared from 20.2 g., 0.11 mole of trans-2-chloro-N,N-dimethylcyclopentylamine hydrochloride) in toluene. The resulting mixture was stirred and heated under reflux for about 19 hours. The reaction product was separated and purified by the method described in Example 2 to give 18.5 g. of viscous crude base. This base was converted to the hydrochloride salt by conventional means and crystallized from ethyl acetate to give 9.0 g. of trans-α - cyclopentyl - 2 - (dimethylamino) - α-phenylcyclopentaneacetonitrile hydrochloride, melting point (from ethanol-ethyl acetate) 225–228° C. (d.).

*Analysis.*—Calculated for $C_{20}H_{29}ClN_2$ (percent): C, 72.15; H, 8.78; N, 8.41. Found (percent): C, 71.98; H, 8.93; N, 8.30.

EXAMPLE 16

Trans-α-cyclohexyl-2-(dimethylamino)-α-phenylcyclopentaneacetonitrile

The carbanion prepared from α-phenylcyclohexaneacetonitrile and sodium amide was reacted with trans-2-chloro-N,N-dimethylcyclopentylamine using the procedure described in Example 15 and refluxing for 20 hours. The oily crude base was recrystallized from 95 percent ethanol to give trans-α-cyclohexyl-2-(dimethylamino)-α-phenylcyclopentaneacetonitrile, melting point 98–112° C.

*Analysis.*—Calculated for $C_{21}H_{30}N_2$ (percent): C, 81.23; H, 9.74; N, 9.02. Found (percent): C, 81.05; H, 9.61; N, 9.17.

EXAMPLE 17

Trans-α-cyclohexyl-2-(dimethylamino)-α-phenylcyclopentaneacetamide

Trans-α-cyclohexyl - 2 - (dimethylamino) - α - phenylcyclopentaneacetonitrile was hydrated according to the method of Example 3 to give trans-α-cyclohexyl-2-(dimethylamino)-α - phenylcyclopentaneacetamide, melting point 152–154° C.

*Analysis.*—Calculated for $C_{21}H_{32}N_2O$ (percent): C, 76.78; H, 9.82; N, 8.53. Found (percent): C, 76.76; H, 9.96; N, 8.64.

EXAMPLE 18

Trans-2-(dimethylamino)-α-isopropyl-α-(1-naphthyl)cyclopentaneacetonitrile hydrochloride 2-(1-naphthyl) - 3 - methylbutyronitrile and trans-2-chloro - N,N - dimethylcyclopentylamine were reacted, using the method of Example 2 to give trans-2-(dimethylamino)-α-isopropyl-α-(1 - naphthyl)cyclopentaneacetonitrile, the hydrochloride of which crystallized from methanol, melting point 250–253° C. (d.).

*Analysis.*—Calculated for $C_{22}H_{29}ClN_2$ (percent): C, 74.03; H, 8.19; N, 7.85. Found (percent): C, 74.32; H, 8.25; N, 7.75.

EXAMPLES 19–64

Other representative compounds of the present invention prepared using the methods described and exemplified hereinabove include:

Trans - 1 - (2 - chlorocyclopentyl)pyrrolidine hydrochloride, prepared from trans-2-(1-pyrrolidino)cyclopentanol by the method of Example 1.

Trans - 4 - (2 - chlorocyclopentyl)morpholine hydrochloride (very hygroscopic), prepared from trans-2-morpholinocyclopentanol by the method of Example 1.

*Analysis.*—Calculated for $C_9H_{17}Cl_2NO$ (percent): C, 31.50. Found (percent): Cl, 30.59.

Trans - 1 - (2 - bromocyclopentyl)piperidine hydrobromide, prepared from trans-2-piperidinocyclopentanol by the method of Example 1, using thionyl bromide.

Trans - 2 - bromo-N,N-dimethylcyclopentylamine hydrobromide, prepared from trans-2-(dimethylamino)cyclopentanol by the method of Example 1, using thionyl bromide.

Trans - 1 - (2 - chlorocyclopentyl)-4-tert-butylpiperazine dihydrochloride, prepared from trans-2-(4-tert-butyl-1-piperazino)cyclopentanol by the method of Example 1.

Trans - 1 - (2 - chlorocyclopentyl)-4-methylpiperazine dihydrochloride, prepared from trans-2-(4-methyl-1-piperazino)cyclopentanol by the method of Example 1.

Trans - N - (2 - chlorocyclopentyl)hexamethyleneimine hydrochloride, prepared from trans-2-(1-hexamethyleneimino)cyclopentanol by the method of Example 1.

Trans-α,α-bis(p-chlorophenyl) - 2 - (dimethylamino)cyclopentaneacetonitrile, prepared from trans-2-chloro-N,N-dimethylcyclopentylamine and α,α-bis(p-chlorophenyl)acetonitrile, by the method of Example 2.

Trans-α,α-bis(p-chlorophenyl) - 2 - (dimethylamino)cyclopentaneacetamide, prepared from trans-α,α-bis(p-chlorophenyl) - 2 - (dimethylamino)cyclopentaneacetonitrile by the method of Example 3.

*Analysis.*—Calculated for $C_{21}H_{24}Cl_2N_2O$ (percent): C, 64.45; H, 6.18; Cl, 18.12; N, 7.16. Found (percent): C, 64.29; H, 6.35; Cl, 18.24; N, 6.94.

Trans - 2 - (N-benzyl-N-methylamino)-α,α-diphenylcyclopentaneacetamide, prepared from trans-2-(N-benzyl-N-methylamino) - α,α - diphenylcyclopentaneacetonitrile (Example 8) by the method of Example 3, melting point 159–161° C.

Trans - 2 - (1 - pyrrolidino)-α,α-diphenylcyclopentaneacetonitrile, prepared from trans-N-(2-chlorocyclopentyl)pyrrolidine and α,α-diphenylacetonitrile by the method of Example 2.

Trans - 2 - (1 - pyrrolidino)-α,α-diphenylcyclopentaneacetamide, prepared from trans-2-(2-pyrrolidino)-α,α-diphenylcyclopentaneacetonitrile by the method of Example 3, crystallized from benzene, melting point 152–157° C.

*Analysis.*—Calculated for $C_{23}H_{28}N_2O$ (percent): C, 79.27; H, 8.10; N, 8.04. Found (percent): C, 78.98; H, 8.24; N, 8.07.

Trans-α-cyclopropyl - 2 - (dimethylamino) - α - phenylcyclopentaneacetonitrile, prepared from trans-2-bromo-N, N-dimethylcyclopentylamine and α-cyclopropyl-α-phenylacetonitrile by the method of Example 15.

Trans-α-cyclopropyl - 2 - (dimethylamino)-α-phenylcyclopentaneacetamide, prepared from trans-α-cyclopropyl-2 - (dimethylamino)-α-phenylcyclopentaneacetonitrile by the method of Example 3.

Trans - 2 - morpholino-α,α-diphenylcyclopentaneacetonitrile, prepared from trans-4-(2-chlorocyclopentyl)morpholine and α,α-diphenylacetonitrile by the method of Example 2.

Trans - 2 - morpholine-α,α-diphenylcyclopentaneacetamide, prepared from trans-2-morpholino-α,α-diphenylcyclopentaneacetonitrile by the method of Example 3, crystallized from benzene-cyclohexane, melting point 148–151° C.

Trans - 2 - chloro-N,N-dipropylcyclopentylamine, prepared from trans-2-(dipropylamino)cyclopentanol by the method of Example 1.

Trans - 2 - (dimethylamino)-α-phenyl-α-(p-tolyl)cyclopentaneacetamide, prepared from trans-2-(dimethylamino)-α-phenyl-α-(p-tolyl)cyclopentaneacetonitrile by the method of Example 3, crystallized from benzene-cyclohexane, melting point 175–179.5° C.

*Analysis.*—Calculated for $C_{22}H_{28}N_2O$ (percent): C, 78.53; H, 8.39; N, 8.33. Found (percent): C, 79.07; H, 8.74; N, 8.42.

Trans - 2 - (dimethylamino)-α-isopropyl-α-phenylcyclopentaneacetonitrile, prepared from trans-2-chloro-N,N-dimethylcyclopentylamine and 3-methyl-2-phenylbutyronitrile by the method of Example 2.

Trans - 2 - (dimethylamino)-α-isopropyl-α-phenylcyclopentaneacetamide, prepared from trans - 2 - (dimethylamino)-α-isopropyl - α - phenylcyclopentaneacetonitrile by the method of Example 3, melting point 117–121° C.

Trans - 2 - (dimethylamino)-α-isobutyl-α-phenylcyclopentaneacetonitrile, prepared from trans-2-chloro-N,N- dimethylcyclopentylamine and 4-methyl-2-phenylvaleronitrile by the method of Example 2.

Trans - 2 - (dimethylamino)-α-isobutyl-α-phenylcyclopentaneacetamide, prepared from trans - 2 - (dimethylamino)-α-isobutyl - α - phenylcyclopentaneacetonitrile by the method of Example 3.

Trans - 2 - (dimethylamino)-α-phenyl-α-(p-tolyl)cyclopentaneacetonitrile hydrochloride, prepared from trans-2-chloro-N,N-dimethylcyclopentylamine and α-phenyl-α-(p-tolyl)acetonitrile by the method of Example 2, crystallized from methanol-ethyl acetate, melting point 236–238° C. (d.).

Trans - 2 - (dimethylamino) - α - isopropyl-α-(1-naphthyl)cyclopentaneacetamide, prepared from trans-2-(dimethylamino)-α-isopropyl - α - (1-naphthyl)cyclopentaneacetonitrile by the method of Example 3.

Trans - 2 - chloro-N-ethyl-N-methylcyclopentylamine, prepared from trans-2-(N-ethyl - N - methylamino)cyclopentanol by the method of Example 1.

Trans - N,N - dibenzyl-2-chlorocyclopentylamine, prepared from trans-2-(dibenzylamino)cyclopentanol by the method of Example 1.

Trans - 2 - (N-ethyl-N-methylamino)-α,α-diphenylcyclopentaneacetonitrile, prepared from trans-2-chloro-N-ethyl-N-methyl-cyclopentylamine and α,α-diphenylacetonitrile by the method of Example 2.

Trans - 2 - (N-ethyl-N-methylamino)-α,α-diphenylcyclopentaneacetamide, prepared from trans-2-(N-ethyl-N-methylamino) - α,α - diphenylcyclopentaneacetonitrile by the method of Example 3.

Trans-2-(dibenzylamino)-α-(p - chlorophenyl)-α-phenylcyclopentaneacetonitrile, prepared from trans-N,N-dibenzyl-2-chlorocyclopentylamine and α-(p-chlorophenyl)-α-phenylacetonitrile by the method of Example 2.

Trans-2-(dibenzylamino)-α-(p - chlorophenyl)-α-phenylcyclopentaneacetamide, prepared from trans-2-(dibenzylamino)-α-(p - chlorophenyl)-α-phenylcyclopentaneacetonitrile by the method of Example 3.

Trans-2-amino-α-(p - chlorophenyl)-α-phenylcyclopentaneacetonitrile, prepared from trans-2-(dibenzylamino)-α-(p - chlorophenyl)-α-phenylcyclopentaneacetonitrile by the method of Example 9.

Trans-2-amino-α-(p - chlorophenyl)-α-phenylcyclopentaneacetamide, prepared from trans-2-(dibenzylamino)-α-(p-chlorophenyl)-α-phenylcyclopentaneacetamide by the method of Example 3.

Trans - α,α - bis(3,4-dichlorophenyl) - 2 - (N-ethyl-N-isopropylamino)cyclopentaneacetonitrile, prepared from trans-2-chloro-N-ethyl-N - isopropylcyclopentylamine and α,α-bis(3,4-dichlorophenyl)acetonitrile by the method of Example 2.

Trans - α,α - bis(3,4-dichlorophenyl) - 2 - (N-ethyl-N-isopropylamino)cyclopentaneacetamide, prepared from trans-α,α-bis(3,4-dichlorophenyl) - 2 - (N-ethyl-N-isopropylamino)cyclopentaneacetonitrile by the method of Example 3.

Trans-2-(dimethylamino)-α,α-bis(3,5 - xylyl)cyclopentaneacetonitrile, prepared from trans - 2 - chloro-N,N-dimethylcyclopentylamine and α,α-bis(3,5-xylyl)acetonitrile by the method of Example 2.

Trans-2-(dimethylamino)-α,α-bis(3,5 - xylyl)cyclopentaneacetamide, prepared from trans-2-(dimethylamino)-α,α-bis(3,5-xylyl)cyclopentylacetonitrile by the method of Example 3.

Trans-α-(p-cumenyl) - 2 - (N-isopropyl-N-methyl)-α-phenylcyclopentaneacetonitrile, prepared from trans-2-chloro-N-isopropyl-N-methylcyclopentylamine and α-(p-cumenyl)-α-phenylacetonitrile by the method of Example 2.

Trans-α-(p-cumenyl)-2-(N-isopropyl-N-methylamino)-α-phenylcyclopentaneacetamide, prepared from trans-α-(p-cumenyl)-2-(N-isopropyl-N-methylamino)-α-phenylcyclopentaneacetonitrile by the method of Example 3.

Trans-α-cycloheptyl - 2 - (dimethylamino)-α-(m-fluorophenyl)-cyclopentaneacetonitrile, prepared from trans-2-chloro-N,N-dimethylcyclopentylamine and α-cycloheptyl-α-(m-fluorophenyl)-acetonitrile by the method of Example 2.

Trans-α-cycloheptyl - 2 - (dimethylamino)-α-(m-fluorophenyl)cyclopentaneacetamide, prepared from trans-α-cyclohepteyl - 2 - (dimethylamino)-α-(m-fluorophenyl)cyclopentaneacetonitrile by the method of Example 3.

Trans-α-(p-bromophenyl) - 2 - (dimethylamino)-α-phenylcyclopentaneacetonitrile, prepared from trans-2-chloro-N,N-dimethylcyclopentylamine and α-(p-bromophenyl)-α-phenylacetonitrile by the method of Example 2.

Trans-α-(p-bromophenyl) - 2 - (dimethylamino)-α-phenylcyclopentaneacetonitrile maleate, prepared from trans-α-(p-bromophenyl) - 2 - dimethylamino-α-phenylcyclopentaneacetonitrile by conventional methods.

Trans-α-(m-iodophenyl) - 2 - (N,N-dipropylamino)-α-phenylacetonitrile, prepared from trans - 2 - bromo-N,N-dipropylcyclopentylamine and α - (m - iodophenyl)-α-phenylacetonitrile by the method of Example 2.

Trans-α-(m-iodophenyl) - 2 - (N,N-dipropylamino)-α-phenylacetamide, prepared from trans-α-(m-iodophenyl)-2 - (N,N-dipropylamino)-α-phenylacetonitrile by the method of Example 3.

Trans-α-(m-chloro-p-tolyl) - 2 - (dimethylamino)-α-phenylacetonitrile, prepared from trans - 2 chloro-N,N-dimethylcyclopentylamine and α - (m-chloro-p-tolyl)-α-phenylacetonitrile by the method of Example 2.

Trans-α-(m-chloro-p-tolyl) - 2 - (dimethylamino)-α-phenylacetamide, prepared from trans-α-(m-chloro-p-tolyl) - 2 - (dimethylamino)-α-phenylacetonitrile by the method of Example 3.

Utility

In the practice of this invention, one of the anti-inflammatory agents of the present invention (a compound of Formula I or a pharmaceutically-acceptable salt thereof) is administered to a warm-blooded animal in an effective amount. Typically, a dose of from about 10 to about 100 mg./kg. of animal body weight gives good results. The anti-inflammatory agents disclosed herein can be administered orally, parenterally or in the form of rectal suppositories.

Preferably, the compounds to be employed in accordance with the present invention are employed in combination with one or more adjuvants suited to the particular route of administration. Thus, in the case of oral administration, the compound is modified with pharmaceutical diluents or carriers such as lactose, sucrose, starch powder, cellulose, talc, magnesium stearate, magnesium oxide, calcium sulfate, acacia powder, gelatin, sodium alginate, sodium benzoate and stearic acid. Such compositions can be formulated as tablets or enclosed in capsules for convenient administration. The compounds can also be mixed with a liquid and administered as elixirs, suspensions, and the like. In the case of parenteral administration, the compound to be used is conveniently formulated in saline to constitute an injectable liquid solution. Other adjuvants and modes of administration are known to those skilled in the art. If desired, the pharmaceutical preparations may contain, in addition to the active component of the present invention, one or more other pharmacologically active substances, for example, acetylsalicylic acid, α-d-propoxyphene, caffeine or acetaminophen (N-acetyl-p-aminophenol).

The following examples are illustrative of the usefulness of compounds of the present invention as anti-inflammatory agents and will enable those skilled in the art to practice the same.

EXAMPLES 65–79

Carrageenin-induced edema assay

The measurement of anti-inflammatory effect through the use of carrageenin-induced edema in the hind paw of the rat is described by Charles A. Winter, Edwin A. Risley and George W. Nuss in Proc. Soc. Exp. Biol. Med., 111:544 (1962)

Method

A carboxymethylcellulose suspension of each compound to be tested is administered subcutaneously to a group of five young Holtzman rats (130 to 150 g. body weight). Some compounds are also administered in carboxymethylcellulose suspension by gastric gavage in a volume of 0.5 ml. per 150 g. body weight. Control animals receive only carboxymethylcellulose. Test compounds are given three hours and one hour prior to injection of carrageenin.

Carrageenin, a mucopolysaccharide of Chondrus, is prepared as a 1 percent suspension in sterile normal saline solution. This suspension (0.05 ml.) is injected into the plantar tissue of the right hind paw of each rat. The volume of the foot thus injected is measured immediately by dipping the foot into a well, displacing mercury. The pressure from the mercury is transferred into electrical output by a Digital Volumetric Measurement System, using a transducer. Foot volumes are again measured three hours after carrageenin injection as the swelling reaches a peak.

The average paw-volume increase in treated animals is compared with the average paw-volume increase in control animals to give the percent inhibition of edema effected by test compounds.

Representative compounds of the present invention were tested according to the above-described procedure measuring inhibition of carrageenin-induced edema. Results are shown in Table I.

TABLE I

| | Percent edema inhibition | | | | | |
|---|---|---|---|---|---|---|
| | Subcutaneous | | | | Oral | |
| Mg./kg | 100 | 50 | 20 | 10 | 50 | 10 |
| Trans-2-(dimethylamino)-α,α-diphenyl-cyclopentaneacetamide | | 74 | | 27 | 14 | 19 |
| Trans-α,α-diphenyl-2-(1-pyrrolidino)-cyclopentaneacetamide | | 82 | 15 | | | |
| Trans-α-cyclohexyl-2-(dimethylamino)-α-phenylcyclopentaneacetamide | | 37 | 34 | | 29 | |
| Trans-α,α-bis(p-chlorophenyl)-2-(dimethylamino)cyclopentaneacetamide | | 77 | | 59 | | |
| Trans-2-(dimethylamino)-α,α-diphenyl-cyclopentaneacetonitrile | | 19.5 | | 6.5 | | |
| Trans-2-(N-methyl-N-benzylamino)-α,α-diphenylcyclopentaneacetamide | | 30 | | | | |
| Trans-α-(p-chlorophenyl)-2-(dimethylamino)-α-phenylcyclopentaneacetonitrile hydrochloride | | 35 | | | | |
| Trans-α-(p-chlorophenyl)-2-(dimethylamino)-α-phenylcyclopentaneacetamide | | 75 | | 61 | | 32 |
| Trans-2-(dimethylamino)-α-methyl-α-phenylcyclopentaneacetamide | | 69 | 32 | | 5 | |
| Trans-α-cyclopentyl-2-(dimethylamino)-α-phenylcyclopentaneacetonitrile hydrochloride | | | 28 | | | |
| Trans-2-(dimethylamino)-α-phenyl-α-(p-tolyl)cyclopentaneacetamide | | 70 | 40 | 23 | | |
| Trans-2-(dimethylamino)-α-isopropyl-α-phenylcyclopentaneacetamide | | 24 | | | | |
| Trans-2-(dimethylamino)-α-isopropyl-α-(1-naphthyl)cyclopentaneacetonitrile hydrochloride | | 38 | | 14 | | |
| Trans-2-(methylamino)-α,α-diphenyl-cyclopentaneacetamide | | 40 | | 9 | | |
| Trans-α,α-diphenyl-2-piperidino-cyclopentaneacetamide | | 63 | | 62 | | |

Preparations

Trans-2-piperidinocyclopentanol: A solution of cyclopentene oxide (16.8 g., 0.20 mole) and piperidine (18.7 g., 0.22 mole) was heated under reflux (140° C.) for about 17 hours. The resulting solution was distilled through a short Vigreux column to give 20.0 g. of trans-2-piperidinocyclopentanol, boiling point 106–108° C./0.4 mm.

*Analysis.*—Calculated for $C_{10}H_{19}NO$ (percent): C, 70.96; H, 11.32; N, 8.28. Found (percent): C, 70.36; H, 11.36; N, 8.57.

Trans-2-morpholinocyclopentanol was prepared from cyclopentene oxide and morpholine by the above procedure. Boiling point 122° C./0.7 mm.

*Analysis.*—Calculated for $C_9H_{17}NO_2$ (percent): C, 63.13; H, 10.00; N, 8.18. Found (percent): C, 62.99; H, 10.55; N, 8.10.

Trans-2-(4-methyl-1-piperazino)cyclopentanol was prepared from cyclopentene oxide and N-methylpiperazine by the above-described procedure. Boiling point 120° C./0.37 mm.

*Analysis.*—Calculated for $C_{10}H_{20}N_2O$ (percent): C, 65.17; H, 10.94; N, 15.20. Found (percent): C, 65.36; H, 11.02; N, 15.15.

Trans-2-(N-benzyl-N-methylamino)cyclopentanol was prepared from cyclopentene oxide and N-benzyl-N-methylamine by the above-described procedure. Boiling point 121.5–123.5° C./0.4 mm.

*Analysis.*—Calculated for $C_{13}H_{19}NO$ (percent): C, 76.05; H, 9.33; N, 6.82. Found (percent): C, 76.09; H, 9.35; N, 6.32.

I claim:

1. A compound of the following formula:

(I) 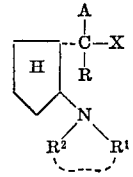

wherein
R represents hydrogen, a straight- or branched-chain alkyl of 1 to 4 carbon atoms, cycloalkyl of 3 to 7 carbon atoms, phenyl, or phenyl bearing one or two substituents, each of which individually is halogen of atomic weight less than 85 or a straight- or branched-chain alkyl of 1 to 3 carbon atoms;

A represents phenyl; or phenyl bearing one or two substituents, each of which individually is halogen of atomic weight less than 85 or a straight- or branched-chain alkyl of 1 to 3 carbon atoms; or, when R is hydrogen or alkyl as defined, A additionally can represent naphthyl;

X represents carbamoyl or cyano; and each of $R^1$ and $R^2$, when taken separately, independently represents hydrogen, a straight- or branched-chain alkyl of 1 to 3 carbon atoms, or benzyl; or $R^1$ and $R^2$, when taken together, jointly constitute with the nitrogen atom to which they are attached pyrrolidino, piperidino, 4-(straight- or branched-chain alkyl of 1 to 4 carbon atoms)piperazino, hexamethyleneimino, or morpholino;

and the pharmaceutically-acceptable acid-addition salts thereof.

2. The compound of claim 1 which is trans-α-(p-chlorophenyl)-2-(dimethylamino) - α - phenylcyclopentaneacetamide and the defined salts thereof.

3. The compound of claim 1 which is trans-2-(dimethylamino)-α,α-diphenylcyclopentaneacetamide and the defined salts thereof.

4. The compound of claim 1 which is trans-α,α-diphenyl-2-piperidinocyclopentaneacetamide and the defined salts thereof.

5. The compound of claim 1 which is trans-2-(dimethylamino) - α - isopropyl - α - (1-naphthyl)cyclopentaneacetonitrile hydrochloride and the defined salts thereof.

References Cited

UNITED STATES PATENTS 3,506,670  4/1970  Szmuszkovicz ----- 260—293.84
3,652,559  3/1972  Szmuszkovicz ---- 260—247.5 R HENRY R. JILES, Primary Examiner S. D. WINTERS, Assistant Examiner U.S. Cl. X.R.

260—247, 247.2 A, 268 R, 268 CN, 239 B, 293.75, 326.3, 326.62, 465 E, 558 A, 293.65, 326.8, 563 R, 570.9, 247.7 A, 465 R; 424—244, 248, 250, 267, 274, 324, 304